(12) United States Patent
Kang et al.

(10) Patent No.: US 11,042,450 B2
(45) Date of Patent: Jun. 22, 2021

(54) MECHANISM FOR MANAGING CONTAINER RUNTIME STATE

(71) Applicant: International Business Machines Corporation, Armonk, NY (US)

(72) Inventors: Hui Kang, Elmsford, NY (US); Michael V. Le, Ossining, NY (US); Shu Tao, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 15/221,702

(22) Filed: Jul. 28, 2016

(65) Prior Publication Data
US 2018/0032410 A1  Feb. 1, 2018

(51) Int. Cl.
*G06F 11/14* (2006.01)
*G06F 9/455* (2018.01)

(52) U.S. Cl.
CPC ...... *G06F 11/1469* (2013.01); *G06F 9/45558* (2013.01); *G06F 2009/45575* (2013.01); *G06F 2201/80* (2013.01)

(58) Field of Classification Search
CPC .......................... G06F 9/45558; G06F 11/1469
See application file for complete search history.

(56) References Cited

U.S. PATENT DOCUMENTS

| | | | |
|---|---|---|---|
| 5,999,944 A * | 12/1999 | Lipkin | G06F 16/26 |
| 6,088,698 A * | 7/2000 | Lipkin | G06T 17/00 |
| 8,224,933 B2 | 7/2012 | Fikouras | |
| 10,318,592 B2 * | 6/2019 | Ciabarra, Jr. | G06F 16/986 |
| 2003/0051066 A1 | 3/2003 | Pace | |
| 2003/0221095 A1 * | 11/2003 | Gaunt | G06F 11/1417 713/1 |
| 2004/0172618 A1 * | 9/2004 | Marvin | G06F 8/36 717/116 |
| 2005/0114871 A1 * | 5/2005 | Wolff | G06F 9/445 719/331 |
| 2009/0300641 A1 * | 12/2009 | Friedman | G06F 11/3664 718/104 |
| 2010/0115334 A1 * | 5/2010 | Malleck | G06F 9/485 714/15 |

(Continued)

OTHER PUBLICATIONS

Disclosed Anonymously (disclosure authored by inventors and submitted under 35 U.S.C. §102(b)(1)(A)) "Mechanism for Managing Container Runtime State," http://priorart.ip.com/IPCOM/000244345D, IP.com No. IPCOM000244345D, Dec. 3, 2015, pp. 1-5.

(Continued)

*Primary Examiner* — Eliyah S. Harper
(74) *Attorney, Agent, or Firm* — Joseph Petrokaitis; Otterstedt, Wallace & Kammer, LLP

(57) ABSTRACT

A method for checkpointing includes capturing a runtime state image of an application running in a container, wherein the runtime state image includes memory state data and file system state data of the container, adding the runtime state image to a collection of runtime state images associated with the container, and restoring the container to a specified state by retrieving at least a portion of the memory state data and file system state data of the runtime state image from the collection of runtime state images.

11 Claims, 7 Drawing Sheets

(56) References Cited

U.S. PATENT DOCUMENTS

| | | |
|---|---|---|
| 2011/0235902 A1* | 9/2011 | Chittar ................. G06F 16/532 |
| | | 382/162 |
| 2012/0167117 A1 | 6/2012 | Kekeh |
| 2012/0311580 A1* | 12/2012 | Emelianov ............ G06F 16/119 |
| | | 718/100 |
| 2013/0311890 A1 | 11/2013 | Cui |
| 2014/0122435 A1 | 5/2014 | Chavda |
| 2014/0137125 A1 | 5/2014 | Hsu |
| 2014/0317293 A1 | 10/2014 | Shatzkamer |
| 2016/0328421 A1* | 11/2016 | Sarratori ................. G06F 16/54 |

OTHER PUBLICATIONS

Madiha H. Syed. et al.,"The Software Container pattern," In Proceedings of the 22nd Conference on Pattern Languages of Programs 2015, Pittsburgh, PA, USA, Oct. 24-26, 2015, pp. 1-7.

* cited by examiner

MECHANISM FOR MANAGING CONTAINER RUNTIME STATE

BACKGROUND

The present disclosure relates generally to the software arts, and more particularly, to methods for checkpointing, restoring, storing, managing, and sharing runtime state of container.

A container is an operating system (OS) level virtualization mechanism providing multiple and simultaneous isolated user-space contexts. Isolation is implemented as functions in a host kernel. Containers are being used to run applications with state (state in memory and disk). Runtime state of a container refers to data that resides on disk and/or in memory. Runtime state is necessary for on-going and correct operation of processes in a container.

BRIEF SUMMARY

According to an exemplary embodiment of the present invention, a method for checkpointing includes capturing a runtime state image of an application running in a container, wherein the runtime state image includes memory state data and file system state data of the container, adding the runtime state image to a collection of runtime state images associated with the container, and restoring the container to a specified state by retrieving at least a portion of the memory state data and file system state data of the runtime state image from the collection of runtime state images.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

enabling a runtime state of an application in a container to be saved at any time to a repository and restored on the same or different physical host;

enabling tracking and managing of different versions of a container's runtime state; and enabling sharing of container runtime state through access to a common state repository.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Figure 1:
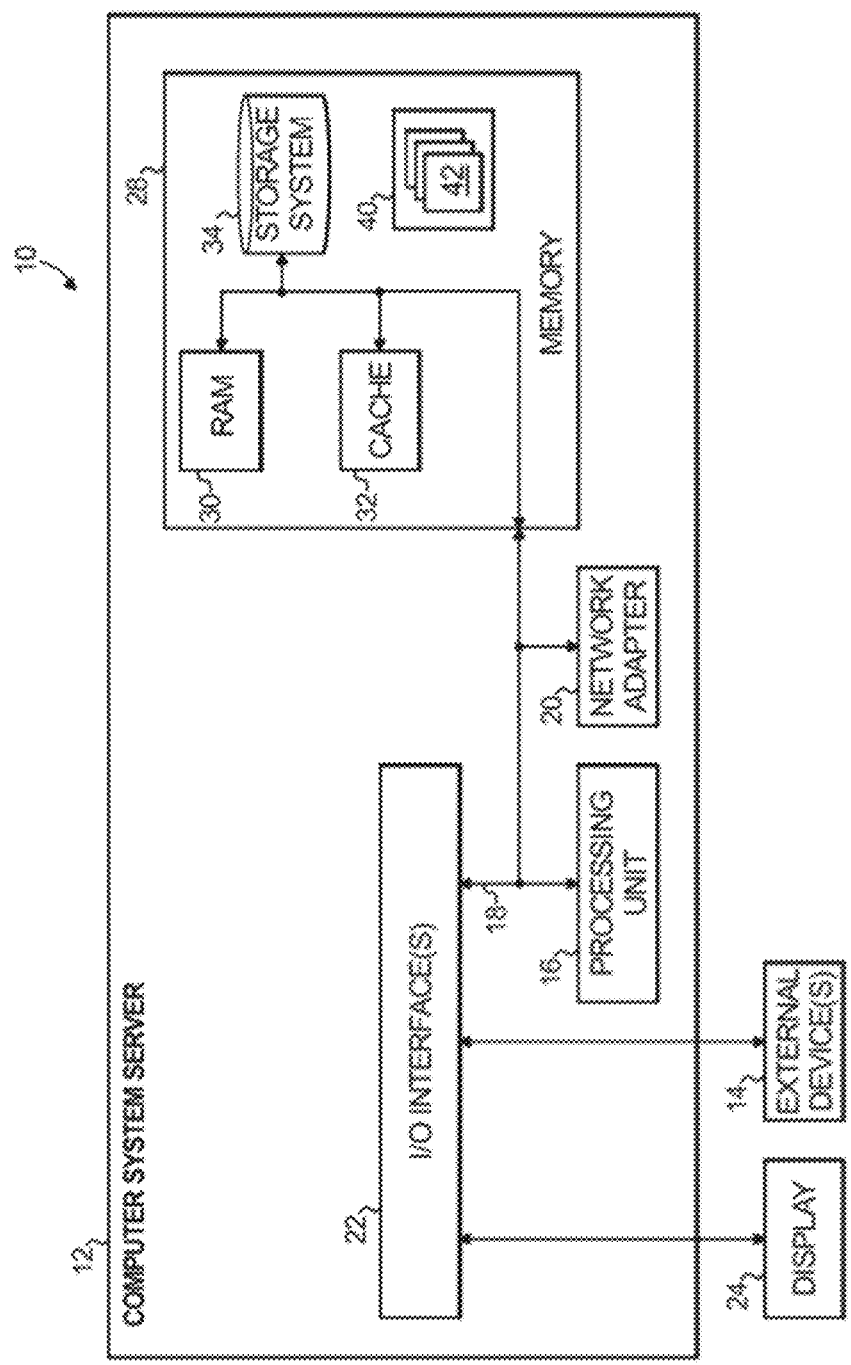
FIG. 1 depicts a cloud computing node according to an embodiment of the present invention.

According to an embodiment of the present invention, the management of a runtime state of container includes: (1) mechanisms for checkpointing and restoring the runtime state of applications running in a container at any time in local host; (2) a repository configured to store the container runtime state and enable the state to be accessed by one or more hosts; and (3) mechanisms for tracking a history of runtime state, enabling versioning of containers.

Herein, the runtime state of a container refers to data that resides on disk and/or memory that is used for on-going and correct operation of processes in a container.

According to an embodiment of the present invention, applications running in containers are checkpointed and share associated runtime states with one or more users or applications. According to an embodiment of the present invention, a host system combines a set of individual mechanisms including state checkpoint/restore, repository for storing checkpointed states, and state versioning for tracking state changes. The capture of an exact runtime state of the container(s) is performed through the association of the memory state with the filesystem state at runtime. When checkpointing a container, the container's filesystem state is snapshot, which results in a filesystem layer ID, e.g., fs-id.

The filesystem layer ID is added to the checkpoint meta data of the container, associating the filesystem state with the runtime state.

According to an embodiment of the present invention, a method for checkpointing a container runtime state enables a runtime state of an application in a container to be saved at any time to a repository and restored on the same or different physical host. According to another embodiment of the present invention, a method for checkpointing a container runtime state enables tracking and managing of different versions of a container's runtime state. According to still another embodiment of the present invention, a method for checkpointing and sharing a container runtime state enables sharing of container runtime state through access to a common state repository.

Exemplary embodiments of the present invention can be implemented to solve problems including: (1) moving containers hosting in-memory data store applications, which are increasingly being deployed in containers (e.g., implemented as part of the cloud native service stack (e.g., Redis, Memcached, RABBITMQ); and (2) managing runtime states of a plurality of containers (e.g., with space and time complexity).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party, and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
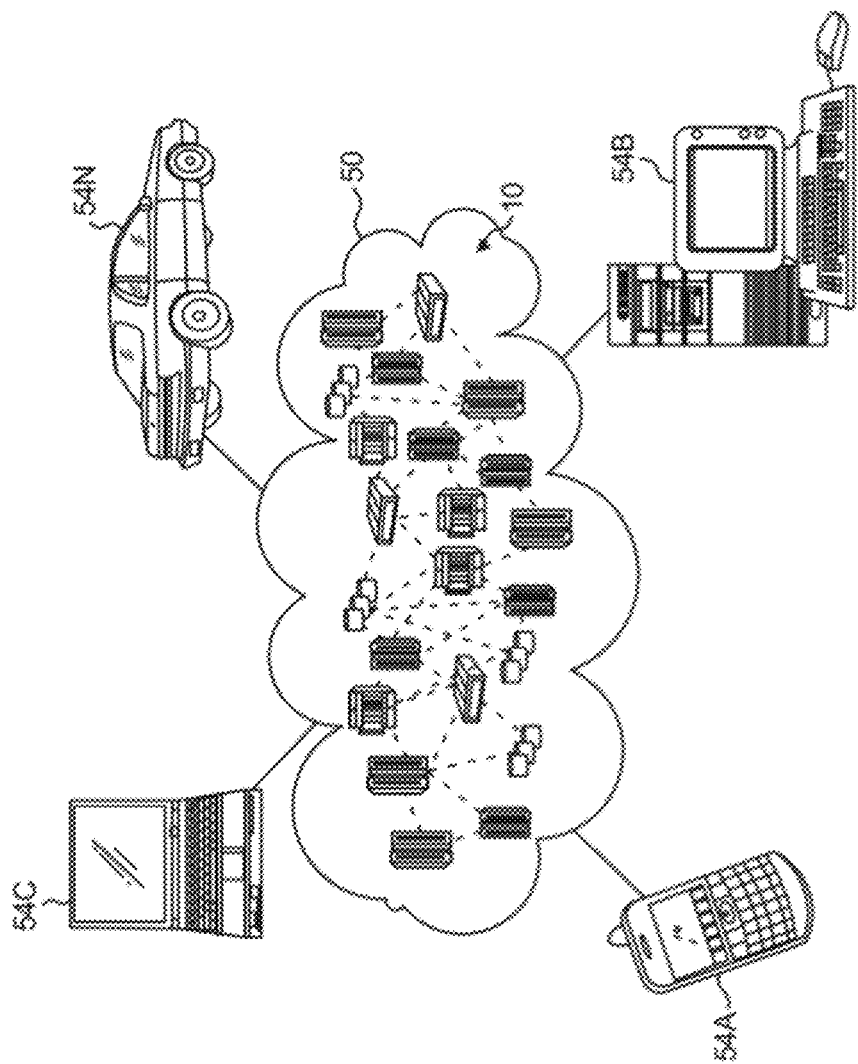
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
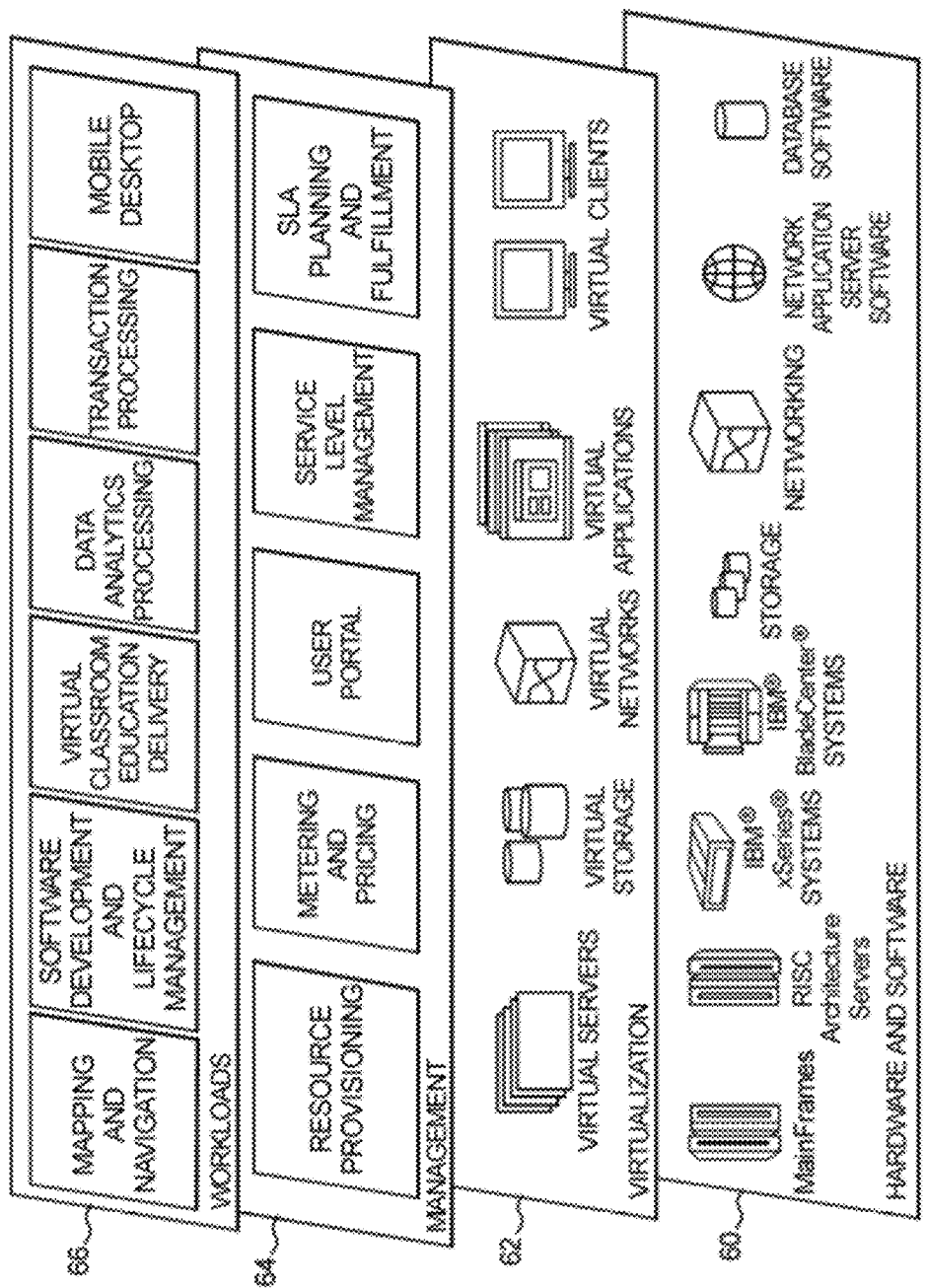
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

According to one or more embodiments of the present invention, a runtime state of an application process in a container is checkpointed and the runtime state is associated with a corresponding filesystem snapshot. According to an embodiment of the present invention, a repository is created that supports uploading and downloading runtime states and corresponding filesystem snapshot. In one or more embodiments of the present invention, a history of a container runtime state in the repository is tracked.

Figure 4:
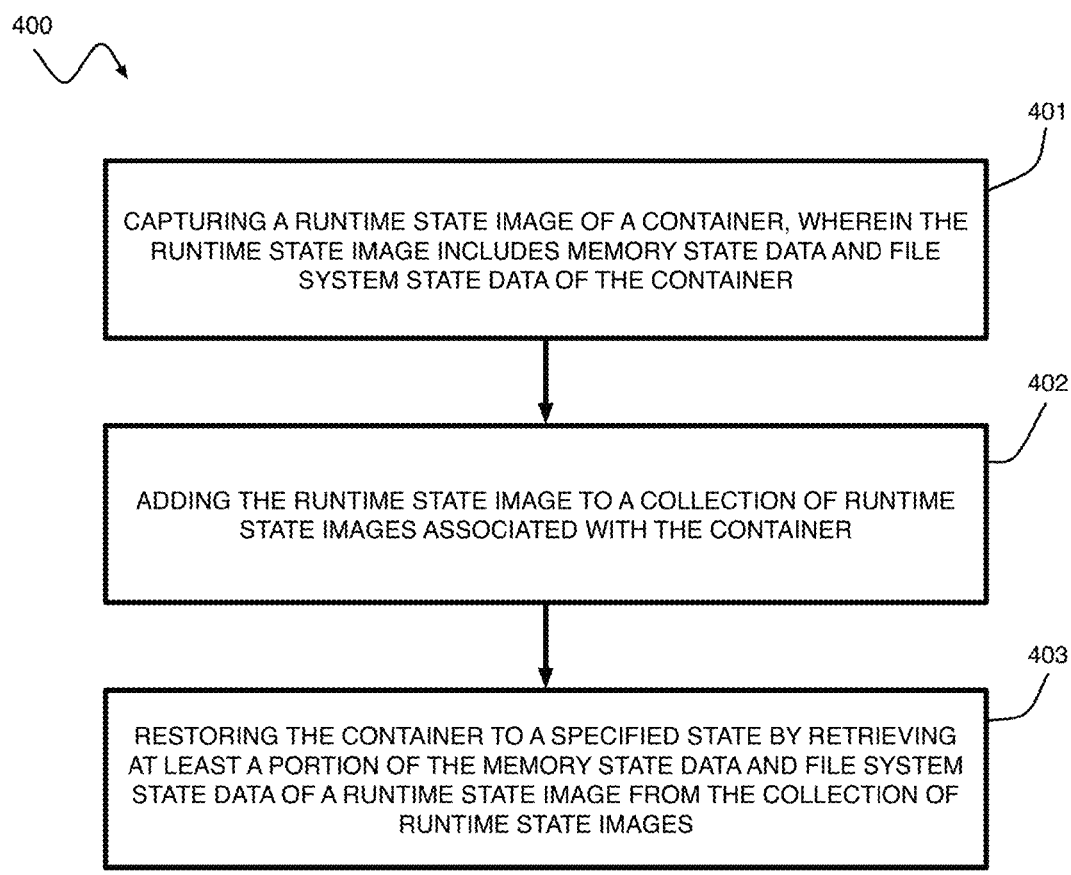
FIG. 4 is an illustration of a method for checkpointing, restoring, storing, managing, and sharing runtime state of container according to an embodiment of the present invention.

According to an embodiment of the present invention and referring to FIG. 4, a method for checkpointing and sharing a container runtime state 400 includes capturing a runtime state image of a container, wherein the runtime state image includes memory state data and filesystem state data of the container 401. For example, a host A (e.g., a physical machine or virtual machine) runs a container, wherein a runtime state of both in-memory and on-disk data are updated by application processes. The method includes adding the runtime state image in a collection of runtime state images associated with the container 402. Stated simply, at any time, the checkpoint operation can checkpoint the in-memory data along with a filesystem snapshot in an image data format. This image data is pushed to the remote registry (see FIG. 6). The method further includes restoring the container to a specified state by retrieving at least a portion of the memory state data and filesystem state data of a runtime state image from the collection of runtime state images 403. Since the same container can be checkpointed multiple times during its life cycle, the history in the repository is tracked for the filesystem snapshots and the in-memory state images. Another host (e.g., host B) can pull the runtime state in terms of filesystem snapshot and in-memory state image from the repository and continue the containers.

Heretofore, no known method exists for checkpointing, restoring, storing, managing and sharing complete container runtime states, either in filesystem or memory.

Figure 5:
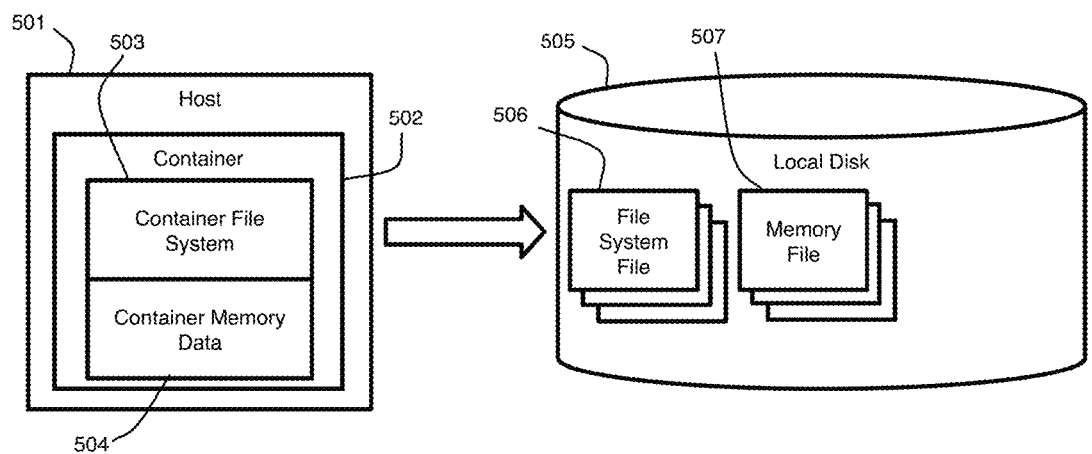
FIG. 5 is an illustration of a method of checkpointing according to an embodiment of the present invention.

Referring to FIG. 5, a host 501 instantiates a container 502. The host 501 can be a physical machine or a virtual machine which runs the container. The container 502 includes a container filesystem 503 and a container memory data 504. Upon checkpointing, data from the container 502 are stored to a local disk 505. The data includes a filesystem and memory data.

In one exemplary embodiment memory data can be stored to /var/lib/container/CONTAINER-ID/statesSTATE-ID/MEM-ID, and a filesystem can be stored to /var/lib/container/CONTAINER-ID/statesSTATE-ID/FS-ID. According to an embodiment of the present invention, changes or deltas (since a last checkpoint) in the filesystem and memory are captured.

According to an embodiment of the present invention, checkpointing the runtime state of a container includes temporarily pausing a running container, and capturing and storing both the container's in-memory data and the filesystem state in local disk. In an exemplary implementation, CRIU is used to pause and dump the in-memory data of a container. The memory data of a container captured by CRIU is in the format of a set of images files, e.g., page -1 .img, fd.img, signalfd.img. All files composing the memory state are stored to a directory (e.g., /var/lib/docker/container/CONTAINER-ID/states/STATE-ID/) and are indexed by both container ID and the state ID.

Figure 6:
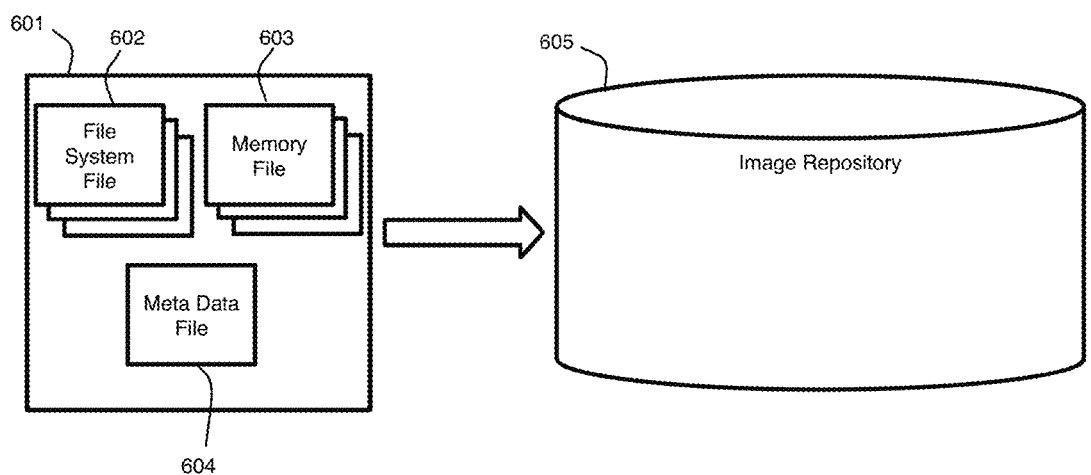
FIG. 6 is an illustration of a method of pushing runtime state to the remote image repository according to an embodiment of the present invention.
Figure 7:
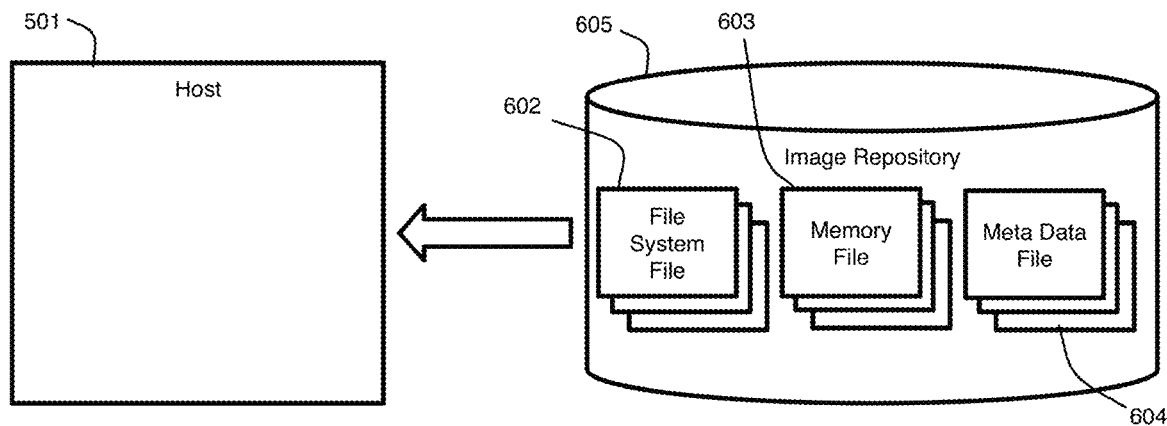
FIG. 7 is an illustration of a method of pulling data from a remote repository according to an embodiment of the present invention.

According to an embodiment of the present invention and referring to FIG. 6, the filesystem of the container is snapshotted to capture the on-disk state of the container. A filesystem snapshot captures the state of the container at a particular point in time. The filesystem snapshot is uploaded to the image repository along with the in-memory state. Since the image is stored in the repository, it is shared by all hosts accessing the repository. The in-memory state and the filesystem snapshot form a captured runtime state 601 of the container. In order to associate a filesystem snapshot 602 and an in-memory state 603, a meta data structure 604 represents a one-to-one mapping (e.g., using the filesystem layer ID added to the checkpoint meta data of the container, associating the filesystem state with the runtime state) between the filesystem snapshot 602 and the in-memory state 603. In at least embodiment of the present invention, the meta data file includes deltas of the memory and filesystem captured between two consecutive checkpoints for optimization. The captured runtime state 601 is stored in an image repository 605 as shown in FIG. 7. The image repository 605 is also referred to as a runtime state repository herein.

To resume the container, the captured runtime state including the filesystem snapshot 602, the in-memory state 603 and meta data structure 604 are restored on a host 501 (the same or another host) or uploaded to another runtime state repository.

Referring to FIG. 7, when the host computer 501 is instructed to resume execution of the program, e.g., by a requestor, meta data files 604 matching a given STATE-ID are pulled from the image repository 605. Further, the filesystem snapshot 602 and the in-memory state 603 (e.g., images) are provided to the requestor/host 501 from the image repository 605. In at least one embodiment, only the deltas are provided to the requestor if the host already has a base image. That is, the host can resume execution at a checkpoint using a base image and the deltas supplied by the local disk.

Figure 8:
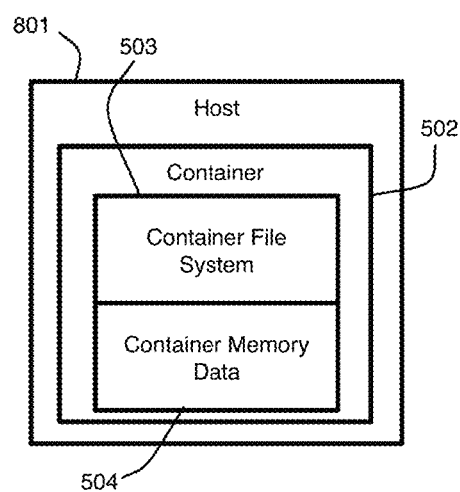
FIG. 8 is an illustration of a method of restoring according to an embodiment of the present invention.

According to an embodiment of the present invention, the runtime state of the container can be restored on a different host 801 (FIG. 8). Referring to the image repository 605 of FIG. 7, the runtime state is downloaded from the image repository 605 to the host 801. The download request is sent to the image repository 605 with a unique key that represents the runtime state. If the runtime state is available in the image repository 605, the image repository 605 responds to the download request by sending the filesystem snapshot 602 and the in-memory state 603 to requestor/host 801. Only deltas of the runtime state are needed if host already contains a base image.

The downloaded state includes the in-memory state 603 of the container, as well as the corresponding filesystem snapshot 602. The restore mechanism of the host (501.801) is responsible for constructing the container context using the filesystem snapshot 602 and the in-memory state 603. The runtime state can now be resumed using the new container.

Docker is an Open Source project that packs, ships, and runs applications as light weight containers. Unlike traditional virtualization, docker containers rely on operating system kernels. Many modern operating system kernels support the primitives needed for containerization, including Linux with openvz, vserver and more recently lxc, Solaris with zones, and FreeBSD with Jails. The Docker platform is built using components including: the cgroups and namespaces capabilities of the Linux kernel, the Go programming language, the Docker Image Specification, the Libcontainer Specification.

Recapitulation

According to an embodiment of the present invention, method for checkpointing comprises capturing a runtime state image of an application running in a container, wherein the runtime state image includes memory state data and file system state data of the container, adding the runtime state image to a collection of runtime state images associated with the container, and restoring the container to a specified state by retrieving at least a portion of the memory state data and file system state data of the runtime state image from the collection of runtime state images.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for checkpointing, restoring, storing, managing, and sharing runtime state of container. Further, a computer program product can include a tangible computer-readable recordable storage medium with code adapted to be executed to carry out one or more method steps described herein, including the provision of the system with the distinct software modules.

Figure 9:
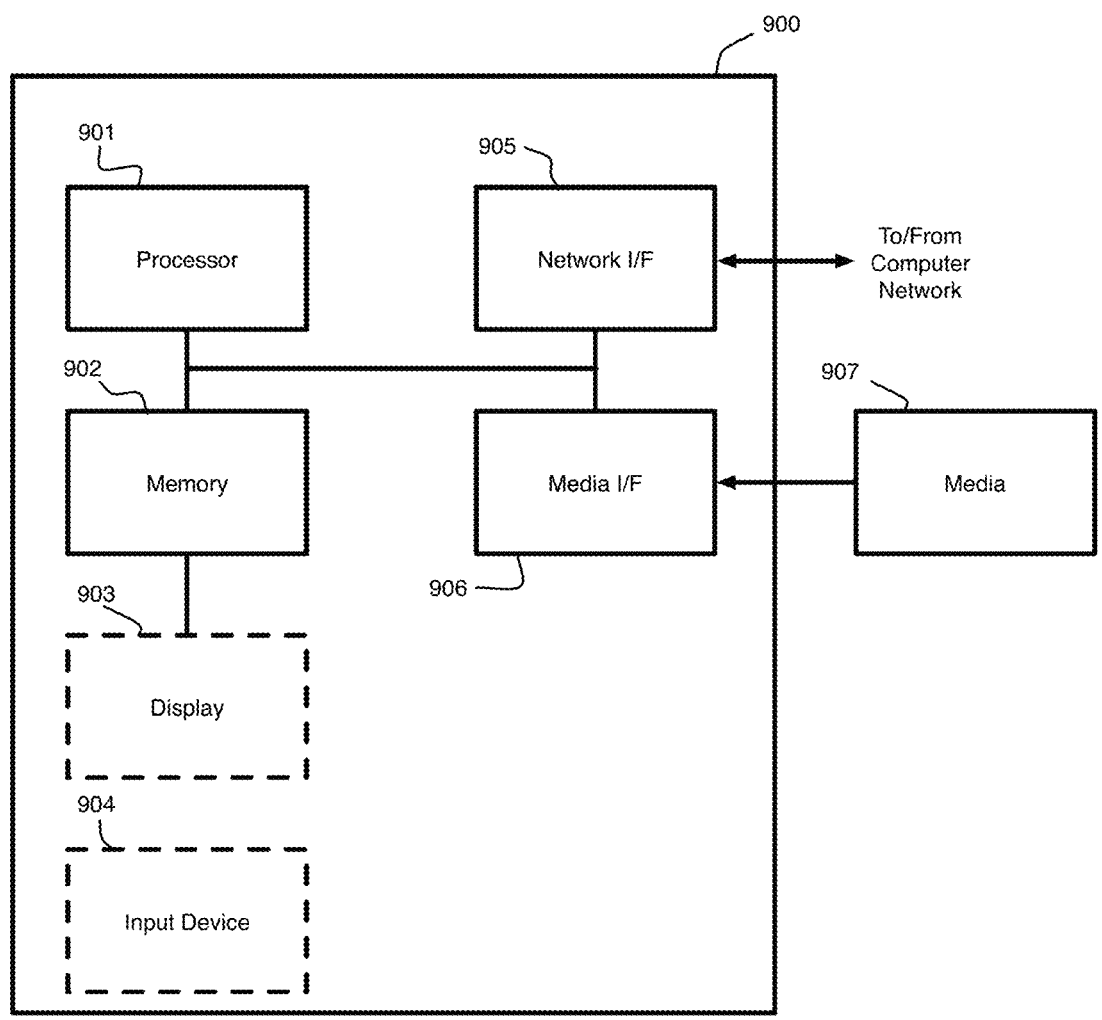
FIG. 9 is a block diagram depicting an exemplary computer system embodying a method for checkpointing, restoring, storing, managing, and sharing runtime state of container according to an exemplary embodiment of the present invention.

Referring to FIG. 9; FIG. 9 is a block diagram depicting an exemplary computer system embodying the computer system for checkpointing, restoring, storing, managing, and sharing runtime state of container (see host 501 in FIG. 5) according to an embodiment of the present invention. The computer system shown in FIG. 9 includes a processor 901, memory 902, display 903, input device 904 (e.g., keyboard), a network interface (I/F) 905, a media I/F 906, and media 907, such as a signal source, e.g., camera, Hard Drive (HD), external memory device, etc.

In different applications, some of the components shown in FIG. 9 can be omitted. The whole system shown in FIG. 9 is controlled by computer readable instructions, which are generally stored in the media 907. The software can be downloaded from a network (not shown in the figures), stored in the media 907. Alternatively, software downloaded from a network can be loaded into the memory 902 and executed by the processor 901 so as to complete the function determined by the software.

The processor 901 may be configured to perform one or more methodologies described in the present disclosure, illustrative embodiments of which are shown in the above figures and described herein. Embodiments of the present invention can be implemented as a routine that is stored in memory 902 and executed by the processor 901 to process the signal from the media 907. As such, the computer system is a general-purpose computer system that becomes a specific purpose computer system when executing routines of the present disclosure.

Although the computer system described in FIG. 9 can support methods according to the present disclosure, this system is only one example of a computer system. Those skilled of the art should understand that other computer system designs can be used to implement embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for checkpointing an application running in a container comprising a container filesystem and container memory data, the method comprising:
capturing a runtime state image of the container in which the application is running, wherein the runtime state image indexes the container memory data and the container file system data by a container identification and a state identification;
adding the runtime state image to a collection of runtime state images associated with the container over time, wherein the collection of runtime state images is stored in a state repository;
sharing the state repository, including the runtime state image, among a plurality of hosts; and
restoring the container to a specified state by retrieving at least a portion of the memory data and file system data of the runtime state image from the collection of runtime state images, wherein restoring the container restores a runtime state of the application captured in the runtime state image, and wherein the step of capturing the runtime state image is performed by a first host and the step of restoring the container, including restoring the runtime state of the application captured in the runtime state image, is performed by a second host using a meta data structure representing a one-to-one mapping between the memory data and the file system data of the container for the runtime state image.

2. The method of claim 1, wherein capturing the runtime state image comprises capturing respective deltas of the memory data and the file system data of the container, wherein the deltas represent a change from a previous capture.

3. The method of claim 1, further comprising pausing the container prior to capturing the runtime state image including the portion of the memory data and file system data of the runtime state image.

4. A computer program product comprising one or more computer readable storage medium having program instructions embodied therewith, said program instructions executable by a processor to cause the processor to:

capture a runtime state image of a container in which at least one application is running, wherein the container comprises a container filesystem and container memory data, wherein the runtime state image includes memory state data and file system state data of the container;

associate the memory state data and the file system state data to a snapshot;

add the runtime state image to a collection of runtime state images associated with the container over time, wherein the collection of runtime state images is stored in a state repository;

share the state repository, including the runtime state images, among a plurality of hosts; and restore the container to a specified state associated with the snapshot by retrieving at least a portion of the memory state data and file system state data of the runtime state image from the collection of runtime state images, wherein restoring the container restores a runtime state of the at least one application captured in the runtime state image, and wherein the capture of the runtime state image is performed by a first host and the restoration of the container, including restoring the runtime state of the at least one application captured in the runtime state image, is performed by a second host using the snapshot representing a one-to-one mapping between the memory data and the file system data of the container for the runtime state image.

5. The computer program product of claim 4, wherein the program instructions executable by the processor to cause the processor to capture the runtime state image further comprises program instructions executable by the processor to cause the processor to capture respective deltas of the memory state data and the file system state data of the container, wherein the deltas represent a change from a previous capture.

6. The computer program product of claim 4, further comprising a program instructions executable by the processor to cause the processor to pause the container prior to capturing the runtime state image.

7. The computer program product of claim 4, wherein the program instructions executable by the processor to associate the memory state data and the file system state data to a snapshot further comprises program instructions executable by the processor to cause the processor to index the memory state data by container identification and state identification.

8. A method for checkpointing comprising:

capturing a runtime state image of a container in which at least one application is running, wherein the runtime state image includes memory state data and file system state data of the container;

generating a meta data structure representing a one-to-one mapping between the memory state data and the file system state data of the container for each capture, wherein the meta data structure is stored in a state repository;

adding the runtime state image to a collection of runtime state images stored in the state repository and associated with the container over time;

sharing the state repository, including the runtime state image, among a plurality of hosts; and restoring the container to a specified state by retrieving, from the state repository, the meta data structure and at least a portion of the memory state data and file system state data of the runtime state image from the collection of runtime state images, wherein restoring the container restores a runtime state of the at least one application captured in the runtime state image, and wherein the step of capturing the runtime state image is performed by a first host and the step of restoring the container, including restoring the runtime state of the application captured in the runtime state image, is performed by a second host using the meta data structure representing the one-to-one mapping between the memory state data and the file system state data of the container for each capture.

9. The method of claim 8, wherein capturing the runtime state image comprises capturing respective deltas of the memory state data and the file system state data of the container, wherein the deltas represent a change from a previous capture.

10. The method of claim 8, further comprising pausing the container prior to capturing the runtime state image.

11. The method of claim 8, wherein at least two applications are running in the container when the runtime state image is captured, the method further comprising restoring the at least two applications when the container is restored.

* * * * *